US012101597B2

(12) United States Patent
Chu et al.

(10) Patent No.: US 12,101,597 B2
(45) Date of Patent: Sep. 24, 2024

(54) SPEAKER MODULE

(71) Applicant: AAC Technologies Pte. Ltd., Singapore (SG)

(72) Inventors: Yufen Chu, Shenzhen (CN); Yao Hui, Shenzhen (CN); Juha Backman, Tampere (FI)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 17/921,962

(22) PCT Filed: Aug. 9, 2022

(86) PCT No.: PCT/CN2022/111195
§ 371 (c)(1),
(2) Date: Oct. 27, 2022

(87) PCT Pub. No.: WO2024/016400
PCT Pub. Date: Jan. 25, 2024

(65) Prior Publication Data

US 2024/0223942 A1 Jul. 4, 2024

(30) Foreign Application Priority Data

Jul. 19, 2022 (CN) ........................ 202210849590.X

(51) Int. Cl.
*H04R 1/30* (2006.01)
*H04R 1/02* (2006.01)
*H04R 1/28* (2006.01)

(52) U.S. Cl.
CPC ............... *H04R 1/30* (2013.01); *H04R 1/025* (2013.01); *H04R 1/2811* (2013.01); *H04R 2499/11* (2013.01)

(58) Field of Classification Search
CPC ........ H04R 1/30; H04R 1/025; H04R 1/2811; H04R 2499/11
USPC .................................................. 381/342–343
See application file for complete search history.

(56) References Cited

U.S. PATENT DOCUMENTS 1,568,589 A * 1/1926 Eddington ............... H04R 1/24 381/186
5,025,886 A * 6/1991 Jung ...................... H04R 1/345 381/342
8,670,585 B2 * 3/2014 Valtchev ................. H04R 1/26 381/186

* cited by examiner

*Primary Examiner* — Suhan Ni
(74) *Attorney, Agent, or Firm* — W&G Law Group

(57) ABSTRACT

The present invention provides a speaker module for a mobile terminal provided with a sound output port. The speaker module includes a speaker box. The speaker box includes a first sound output opening and a second sound output opening. A speaker module also includes a first horn barrel and a second horn barrel. The first horn barrel and the second horn barrel are arranged asymmetrically with respect to the speaker box. The speaker module in the present invention realizes the multi-order coupling of the resonance peak, which not only improves the high-frequency performance, but also widens the frequency band range, and at the same time, reduces the manufacturing cost.

10 Claims, 4 Drawing Sheets

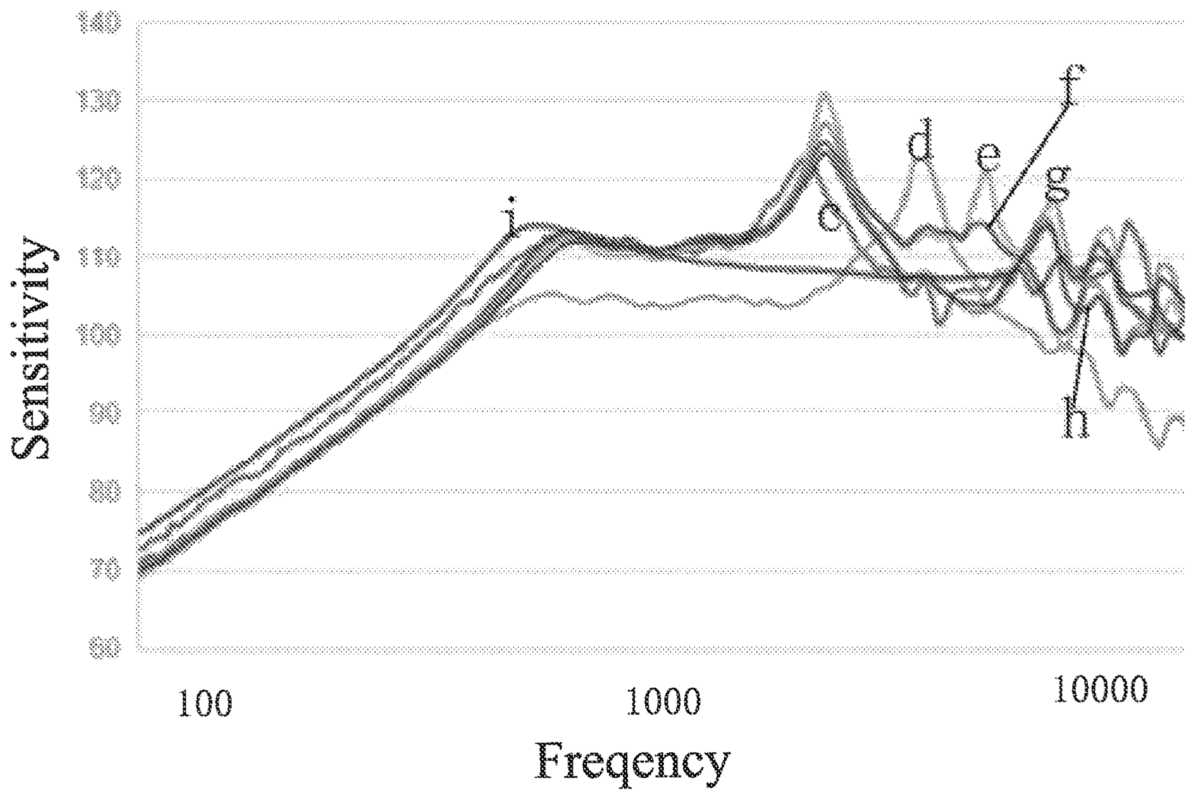

c- multi-level horn plus sound port matching module
d- normal side-sounding module MicSPL (dB)
e- initial version level 2 horn MicSPL (dB)
f- initial version level 2 horn plus sound absorbing MicSPL (dB)
g- multi-level horn with variable sectional surface MicSPL (dB)
h- multi-level horn with variable sectional surface plus sound-absorbing material MicSPL (dB)
i- large back cavity module

Fig. 4

SPEAKER MODULE

FIELD OF THE PRESENT DISCLOSURE

The present invention relates to the field of electro-acoustic transducers, and in particular relates to a speaker module.

DESCRIPTION OF RELATED ART

As for phones, tablets and game consoles, generally a horn barrel is added between the internal speaker box and the sound output port of the mobile terminal in order to play the sound better. The speaker box and the horn barrel can be combined into a speaker module.

The existing speaker module improves acoustic performance by following ways:

1. In the front cavity of the speaker, an attenuation cavity is added and filled with sound absorbing material to improve the resonance peak, and the pipe of the horn barrel is lengthened to improve the number of resonance peaks in the front cavity and the width of the peak. The acoustic performance to a certain extent, the filling of the sound absorbing material increases the manufacturing cost. And its high-frequency radiation capability is weak and bandwidth is insufficient.
2. The attenuation cavity and the horn barrel are distinguished by means of baffles, which can improve the acoustic performance and space utilization to a certain extent. However, there are few resonance peaks, which cannot improve the high-frequency performance.

It can be seen from the above description that the existing speaker module not only has high manufacturing cost, but also has low high frequency performance and insufficient frequency band range. Therefore, it is necessary to provide a new speaker module to solve these problems.

SUMMARY OF THE PRESENT INVENTION

The present invention is to overcome the above-mentioned technical problems and to provide a speaker module, so as to solve the problems of high manufacturing cost, low high frequency performance and insufficient frequency band range of the existing speaker module.

Accordingly, the present invention provides a speaker module for mobile terminal with a sound output port, including: a speaker box having a first sound output opening and a second sound output opening respectively arranged in two opposite side surfaces of the speaker box for sounding from a side; a first horn barrel with an opening connecting with the first sound output opening and another opening connecting with the sound output port of the mobile terminal; and a second horn barrel an opening connecting with the second sound output opening and another opening connecting with the sound output port of the mobile terminal. The first horn barrel and the second horn barrel are arranged asymmetrically with respect to the speaker box.

In addition, the speaker module as described above includes a plurality of the first horn barrels and a plurality of the second horn barrels.

In addition, the first horn barrel includes a first section connected to the first sound output opening, a second section bent and extended from an end of the first section away from the speaker box, and a third section formed by extending an end of the second section away from the first section for connecting to the sound output port of the mobile terminal.

In addition, the second horn barrel includes a fourth section connected to the second sound output opening, and a fifth section that is bent and extended from one end of the fourth section away from the speaker box for connecting to the sound output port of the mobile terminal.

In addition, along a sound output direction of the first horn barrel, an area of a cross-section of the third section gradually increases; along a sound output direction of the second horn barrel, an area of a cross-section area of the fifth section gradually increases.

In addition, a number of resonance peaks of the first horn barrel is proportional to a length thereof.

In addition, the speaker box is rectangular; the first sound output opening and the second sound output opening are respectively set at two short axis edges of the speaker box; the third section of the first horn barrel and the fifth section of the second horn barrel both extend beyond the plane where the long axis edge of the speaker box is located.

In addition, the speaker module includes a plurality of the first horn barrels, wherein the first sections of the multiple first horn barrels are arranged side by side along the short axis direction of the speaker box; a plurality of the second sections of the plurality of first horn barrels are staggered and stacked along a thickness direction of the speaker box; a plurality of the third sections of the plurality of first horn barrels are arranged side by side along the long axis direction of the speaker box.

In addition, the speaker module includes a plurality of the second horn barrels; wherein parts of the fourth sections of the second horn barrels that are close to the speaker box are arranged side by side along the short axis direction of the speaker box; the fourth sections of the plurality of second horn barrels that are far away from the speaker box are staggered and stacked along the thickness direction of the speaker box; the fifth sections of the second horn barrels are arranged side by side along the long axis direction of the speaker box.

In addition, at least one of the second section, the third section and the fifth section is filled with sound absorbing material.

Compared with the prior art, the speaker module in the present invention uses the first horn barrel and the second horn barrel with different lengths, sizes, volumes and shapes to complete the supplementation of the peaks and valleys of the frequency response, and realizes the multi-order coupling of the resonance peaks. It not only improves the high frequency performance, but also widens the frequency band range. At the same time, since there is no need to fill the sound absorbing material, the manufacturing cost of the speaker module is also reduced.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

FIG. 4 is an acoustic performance test result of a kind of speaker module provided by the embodiment of the present invention;

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figures and the embodiment. It should be understood the specific embodiment described hereby is only to explain the disclosure, not intended to limit the disclosure.

Figure 1:
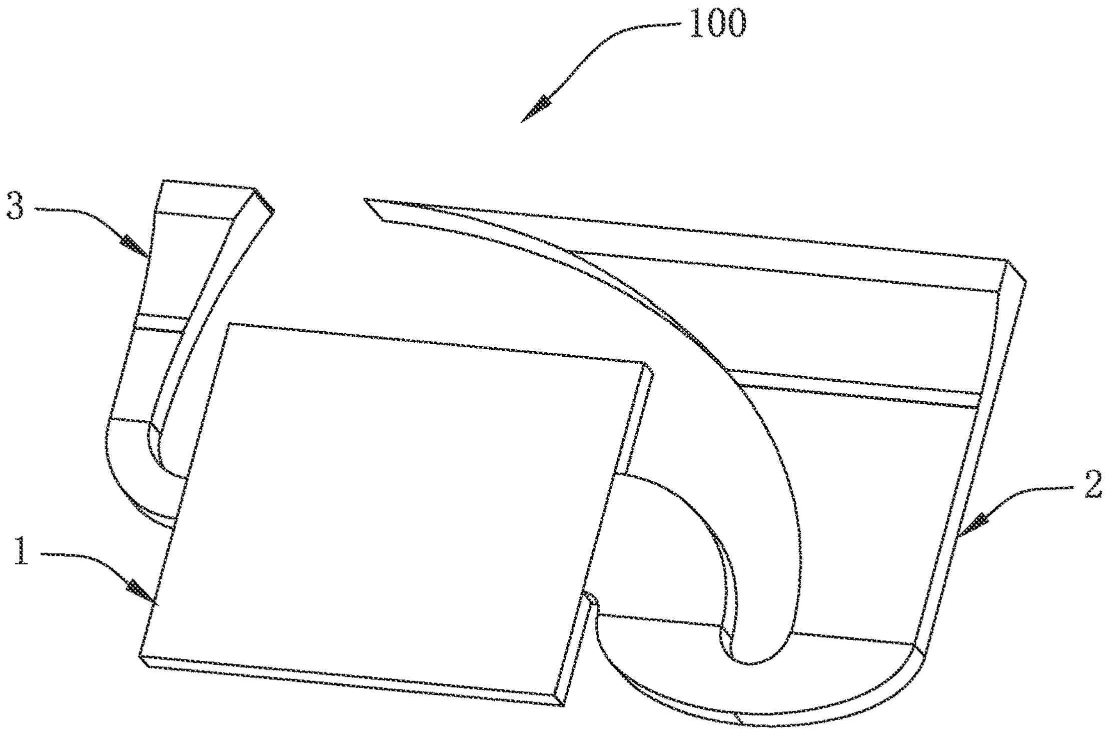
FIG. 1 is an isometric view of a speaker module in accordance with an exemplary embodiment of the present invention.
Figure 2:
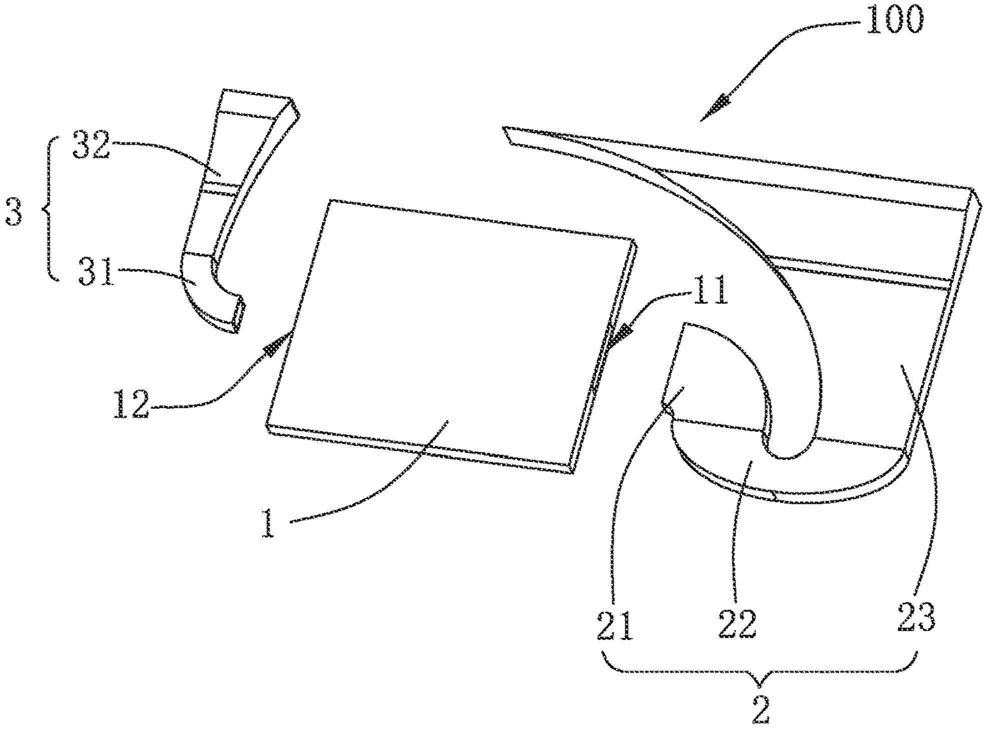
FIG. 2 is an exploded view of the speaker module in FIG. 1.

The embodiment of the present invention provides a speaker module 100. Combined as shown in FIGS. 1-2, the speaker module 100 is used for mobile terminal with sound output port. The speaker module 100 includes the speaker box 1. The speaker box 1 includes a first sound output opening 11 and a second sound output opening 12 for sounding of the side surface. The first sound output opening 11 and the second sound output opening 12 are respectively arranged on two opposite side surfaces of the speaker box 4. The speaker module 100 also includes a first horn barrel 2 and a second horn barrel 3, both of which are hollow in the middle and openings are arranged at both ends. One end of the first horn barrel 2 is connected to the side surface of the speaker box 1 and connected with the first sound output opening 11, and the other end of the first horn barrel 2 is used to connect to the sound output port of the mobile terminal. One end of the second horn barrel 3 is connected to the side surface of the speaker box 1 and connected with the second sound output opening 12, and the other end of the second horn barrel 3 is used to connect to the sound output port of the mobile terminal. The first horn barrel 2 and the second horn barrel 3 are arranged asymmetrically with respect to the speaker box 1.

The first horn barrel 2 and the second horn barrel 3 are arranged asymmetrically with respect to the speaker box 1. The first horn barrel 2 differs from the second horn barrel 3 in length, size, volume and shape.

In this embodiment, both the first horn barrel 2 and the second horn barrel 3 are one. Of course, according to actual requirements, the first horn barrel 2 and the second horn barrel 3 may also be multiple, such as two, three, four, five and so on.

In this embodiment, the speaker box 1 is rectangular, and the first sound output opening 11 and the second sound output opening 12 are respectively set on the two short axis edges of the speaker box 1. Of course, the speaker box 1 can also be designed in other shapes according to actual needs.

In this embodiment, the number of resonance peaks of the first horn barrel 2 is proportional to its length. This design can improve the mid-frequency (1 k-8 khz) loudness.

In this embodiment, the first horn barrel 2 includes a first section 21 connected with the first sound output opening 11, and a second section 22 that is bent and extended from the end of the first section 21 away from the speaker box 1 and is spaced from the speaker box 1, and a third section 23 formed by the end of the second section 22 extending away from the first section 21. The third section 23 is used to connect to the mobile terminal's sound output port.

In this embodiment, the first section 21 is bent at 90 degrees along the first direction, and the second section 22 is bent at 180 degrees along the opposite direction of the first direction. The first horn barrel 2 and improve the space utilization under the premise of the same space.

Wherein, the first direction is the sound output direction of the first sound output opening 11.

In this embodiment, along the sound output direction of the first horn barrel 2, the cross-sectional area of the third section 23 gradually becomes larger.

In this embodiment, the second horn barrel 3 includes a fourth section 31 that is connected to the second sound output opening 12 and a fifth section 32 that is bent and extended from one end of the fourth section 31 away from the speaker box 1 and is spaced from the speaker box 1. The fifth section 32 is used to connect to the sound output port of the mobile terminal. By designing the second horn barrel 3 into two sections, the space occupied by the speaker module 100 can be reduced to a certain extent.

In this embodiment, along the sound output direction of the second horn barrel 3, the cross-sectional area of the fifth section 32 gradually increases.

In this embodiment, the third section 23 of the first horn barrel 2 and the fifth section 42 of the second horn barrel 4 both extend beyond the plane where the long axis edge of the speaker box 1 is located.

As the other embodiment of first horn barrel 2, first horn barrel 2 includes multiple. Multiple first sections 21 of multiple first horn barrel 2 are arranged side by side along the short axis direction of speaker box 1. The second sections 22 of the multiple first horn barrels 2 are staggered and stacked along the thickness direction of the speaker box 1. The third sections 23 of multiple first horn barrels 2 are arranged side by side along the long axis direction of speaker box 1.

As the other embodiment of second horn barrel 3, second horn barrel 3 includes more than one. The plurality of fourth sections 31 of the plurality of second horn barrels 3 that are close to the speaker box 1 are arranged side by side along the short axis direction of the speaker box 1. The plurality of fourth sections 31 of the plurality of second horn barrels 3 that are far from the speaker box 1 are arranged in a staggered and stacked layer along the thickness direction of the speaker box 1. The plurality of fifth sections 32 of the plurality of second horn barrels 3 are arranged side by side along the long axis direction of the speaker box 1.

As a specific embodiment of the first horn barrel 2 and the second horn barrel 3, the first horn barrel 2 is two, and the second horn barrel 3 is also two. Of course, according to actual needs, the first horn barrel 2 can also be three, four, five, etc., and the second horn barrel 3 can also be three, four, five, and so on.

Compared with the prior art, the speaker module 100 in this embodiment uses the first horn barrel 2 and the second horn barrel 3 with different lengths, sizes, volumes and shapes to complete the supplementation of the peaks and valleys of the frequency response, and realizes the multi-order resonance peak. coupling. It not only improves the high frequency performance, but also widens the frequency band range. At the same time, since there is no need to fill the sound absorbing material, the manufacturing cost of the speaker module 100 is also reduced.

Figure 3:
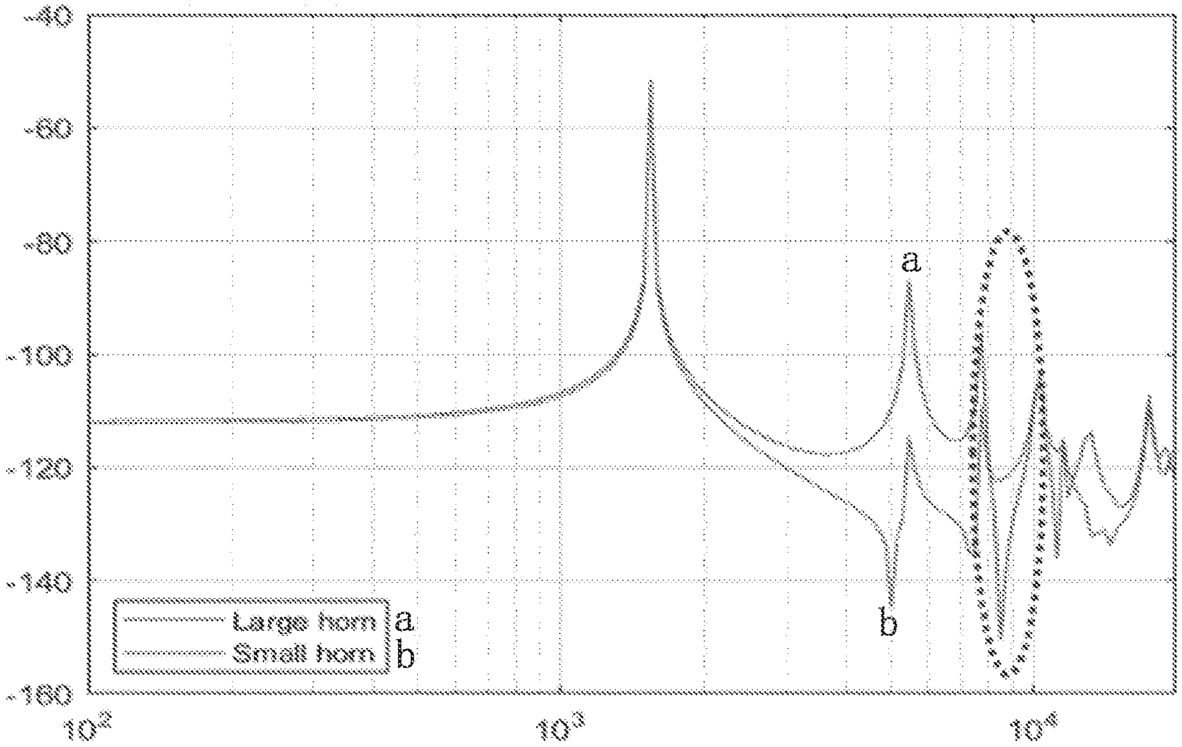
FIG. 3 is a sound power curve of a first horn barrel and a second horn barrel in the speaker module.

In addition, the speaker module 100 in this embodiment is also flexible in design, which can adapt to the asymmetric chassis in the mobile terminal and avoid the specified position in the structure. FIG. 3 is the sound power (dB) curve of the first horn barrel 2 (large horn) and the second horn barrel 3 (small horn) in the speaker module 100. The unilateral second horn barrel 3 is prone to pit valleys at high frequencies. At this time, the second horn barrel 3 can be used for peak and valley compensation to match the curves of the two. In the figure, a is used to represent the large horn sound power curve, and b is used to represent the small horn sound power curve. FIG. 4 is the schematic diagram of test results of the acoustic performance of the speaker module 100. It can be seen from the figure. The sensitivity of the test result curved of the sounding module of conventional side at the same frequency is lower than that of the test result curve c of the multi-level horn plus sound port matching module the test result curve e of the initial version level 2 horn, test result curve f of initial version level 2 horn plus sound absorbing material, test result curve g of multi-level horn with variable sectional surface, test result curve h of multi-level horn with variable sectional surface plus sound-absorbing material, and the test result curve i when the large rear cavity module is sounding. In addition, it can be seen from the above test results that compared with the sounding of the sounding module of conventional side, various solutions with horns have an improvement in the high frequency band. The frequency band bandwidth and frequency response floating of the multi-level horn matching plus sound output hole matching model are higher than other technical solutions.

As the other optional embodiment of the speaker module 100, the second section 22 and/or the third section 23 and/or the fifth section 32 are filled with the sound absorbing material. Although this will increase the manufacturing cost of the speaker, it can supplement the response curve of the first horn barrel 2 and/or the second horn barrel 3 to improve the high frequency performance of the speaker module 100.

Figure 5:
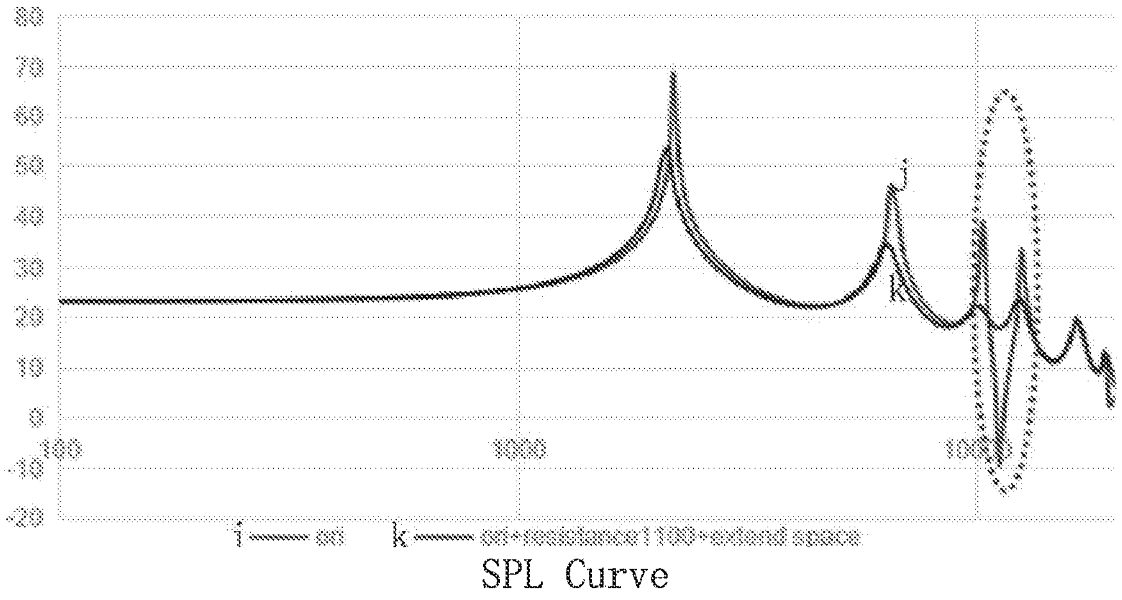
FIG. 5 is a sound pressure level (SPL) curve of the speaker module.

FIG. 5 is the sound pressure level (SPL) graph of the speaker module 100. In the figure, j represents the SPL curve of ori, and k represents the SPL curve of ori+resistance 1100 (internal impedance 1100 pa*s/m)+extend space. The horn barrel from the sounding side of the speaker box 1 horizontal axis to the mobile terminal produces a pit valley at the high frequency position, a small chamber can be used to fill the sound absorbing material to increase the horn damping to smoothen the high frequency SPL curve. By increasing the volume gradually, the acoustic capacitor can be changed, thereby realizing the control of the resonant frequency point.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A speaker module for mobile terminal with a sound output port, including:

a speaker box having a first sound output opening and a second sound output opening respectively arranged in two opposite side surfaces of the speaker box for sounding from a side;

a first horn barrel with an opening connecting with the first sound output opening and another opening connecting with the sound output port of the mobile terminal;

a second horn barrel an opening connecting with the second sound output opening and another opening connecting with the sound output port of the mobile terminal; wherein the first horn barrel and the second horn barrel are arranged asymmetrically with respect to the speaker box.

2. The speaker module as described in claim 1 including a plurality of the first horn barrels and a plurality of the second horn barrels.

3. The speaker module as described in claim 1, wherein, the first horn barrel includes a first section connected to the first sound output opening, a second section bent and extended from an end of the first section away from the speaker box, and a third section formed by extending an end of the second section away from the first section for connecting to the sound output port of the mobile terminal.

4. The speaker module as described in claim 3, wherein the second horn barrel includes a fourth section connected to the second sound output opening, and a fifth section that is bent and extended from one end of the fourth section away from the speaker box for connecting to the sound output port of the mobile terminal.

5. The speaker module as described in claim 4, wherein, along a sound output direction of the first horn barrel, an area of a cross-section of the third section gradually increases; along a sound output direction of the second horn barrel, an area of a cross-section area of the fifth section gradually increases.

6. The speaker module as described in claim 3, wherein a number of resonance peaks of the first horn barrel is proportional to a length thereof.

7. The speaker module as described in claim 4, wherein the speaker box is rectangular; the first sound output opening and the second sound output opening are respectively set at two short axis edges of the speaker box; the third section of the first horn barrel and the fifth section of the second horn barrel both extend beyond the plane where the long axis edge of the speaker box is located.

8. The speaker module as described in claim 7, including a plurality of the first horn barrels, wherein the first sections of the multiple first horn barrels are arranged side by side along the short axis direction of the speaker box; a plurality of the second sections of the plurality of first horn barrels are staggered and stacked along a thickness direction of the speaker box; a plurality of the third sections of the plurality of first horn barrels are arranged side by side along the long axis direction of the speaker box.

9. The speaker module as described in claim 7, including a plurality of the second horn barrels; wherein parts of the fourth sections of the second horn barrels that are close to the speaker box are arranged side by side along the short axis direction of the speaker box; the fourth sections of the plurality of second horn barrels that are far away from the speaker box are staggered and stacked along the thickness direction of the speaker box; the fifth sections of the second horn barrels are arranged side by side along the long axis direction of the speaker box.

10. The speaker module as described in claim 4, wherein at least one of the second section, the third section and the fifth section is filled with sound absorbing material.

* * * * *